July 26, 1938.  H. T. PERSHING, JR  2,124,672
ELECTRIC MOTOR
Filed May 25, 1936  2 Sheets-Sheet 1
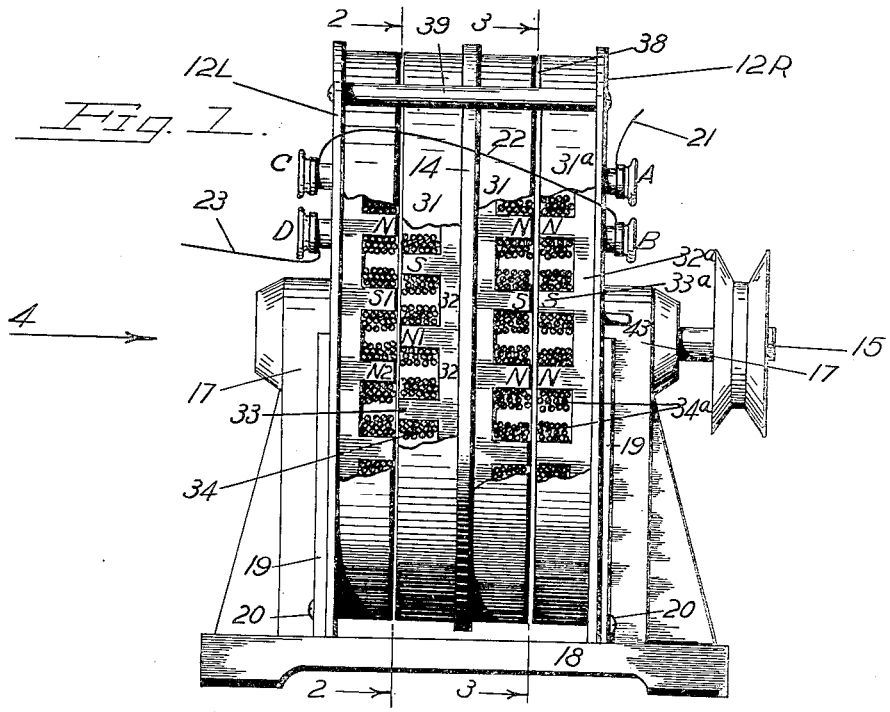
Fig. 1.
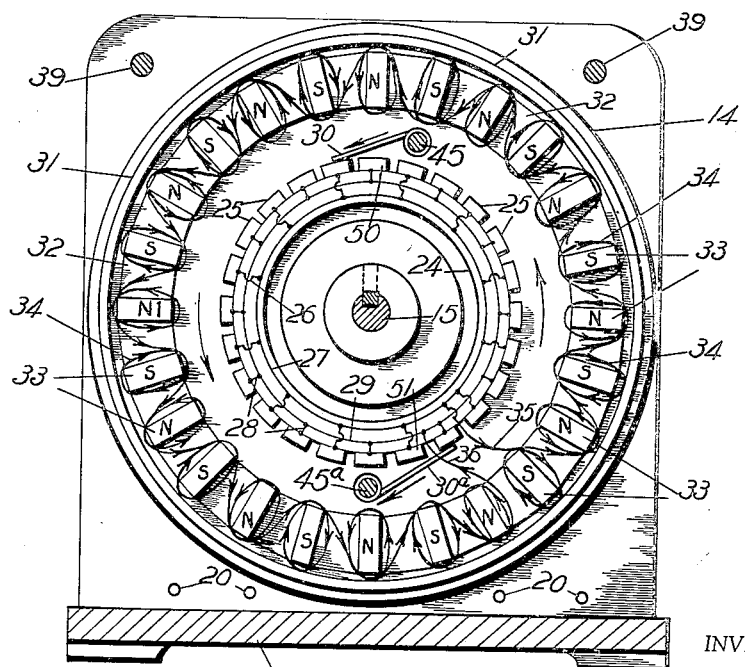
Fig. 2.
INVENTOR.
HOWELL T. PERSHING JR.
BY
ATTORNEY.

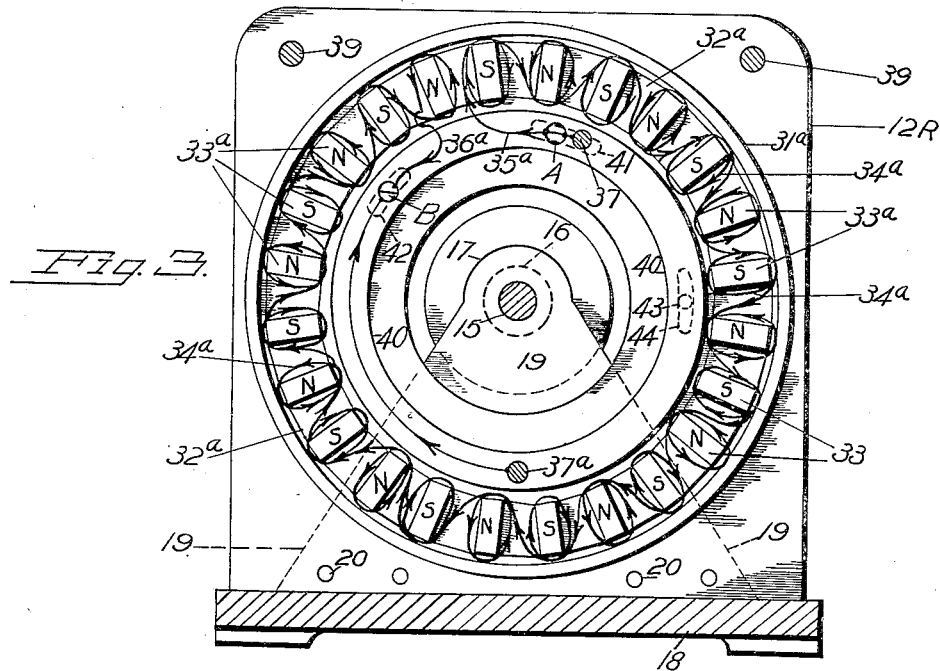
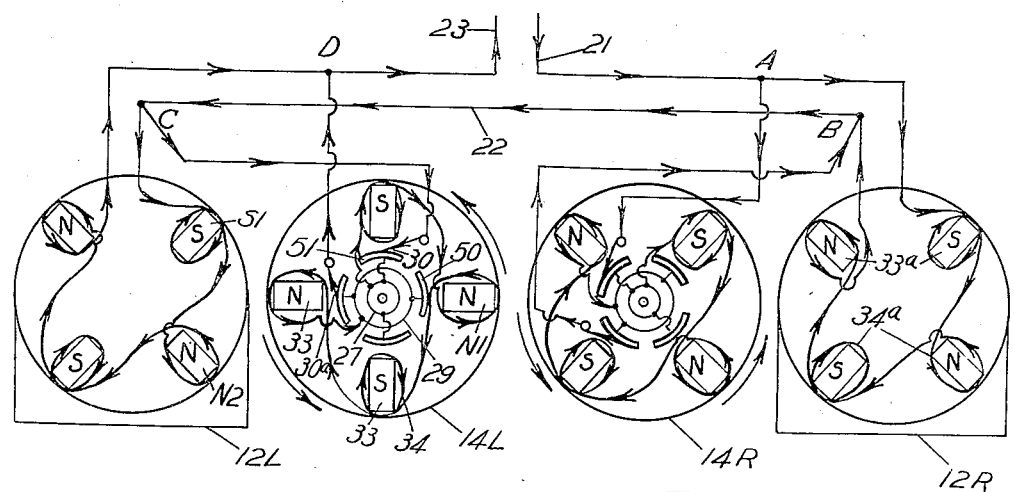
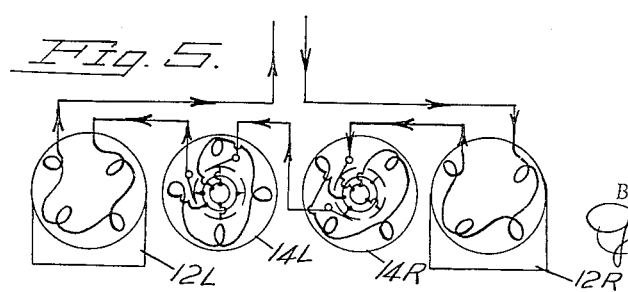

Patented July 26, 1938

2,124,672

UNITED STATES PATENT OFFICE 2,124,672

ELECTRIC MOTOR

Howell T. Pershing, Jr., Denver, Colo.

Application May 25, 1936, Serial No. 81,707

2 Claims. (Cl. 172—36)

My invention relates to an improvement in electric motors.

An object of the invention is the production of an electric motor that will transform electrical energy into mechanical energy at a high rate of efficiency.

Another object is to provide an electric motor of very simple design that can be built and serviced at a low cost.

Another object is to provide an electric motor that is readily cooled.

A further object is to construct an electric motor having a high starting torque.

Other objects and advantages reside in the details of construction which will be more fully disclosed in the drawings and specification.

In the drawings, like parts are similarly designated in all views.

Figure 1 is a front elevation of the motor, partly in section, to show the arrangements of the field and armature coils;

Figure 2 is a section taken on line 2—2, Figure 1;

Figure 3 is a section taken on line 3—3, Figure 1;

Figure 4 is a diagrammatic representation of the wiring of the motor looking in the direction of the arrow 4 in Figure 1;

Figure 5 is a diagrammatic representation of a modification showing the rotor windings in series with the field.

In the drawings, reference character 12L denotes the field plate on the left side of the motor, and 12R the field plate on the right side. The armature or rotor disc 14 is tightly mounted on shaft 15 which is journalled for rotation in ball bearing assemblies 16, supported by bearing stands 17 rising from base 18. The field plates 12L and 12R are attached to field supports 19 by means of screws 20, and mounted on the field plates are binding posts A, B, C and D, which are insulated from the plates.

Power supply line 21 is connected to post A, common carrier conductor 22 connects post B with post C, and power return line 23 is connected with post D.

Referring to Figure 2, a commutator 24 has as many segments 25 as there are poles 33, each alternate one of which is connected by wires 26 to conductor ring 27, the other segments being connected by wires 28 to conductor ring 29. Brushes 30 and 30a bear on the commutator segments in the usual conductive relationship.

Near the periphery of armature disc 14 and concentric therewith, is retaining ring 31 just inside of which is a ring or polygon of magnetic material 32, having a plurality of magnetic poles 33 around which are conductor windings 34, shown diagrammatically in Figure 2, for purposes of absolute clarity. It will be seen in Figure 2 that the direction of the windings about the several magnetic poles is such as to give them alternate polarity at any given instant, and in this particular example they are connected in series, one terminal 35 of the series being connected to conductive ring 27, and the other terminal 36 being connected to conductive ring 29.

In Figure 3 a similar retaining ring 31a is mounted on the field plate 12R and a ring or polygon of magnetic material 32a has the same number of magnetic poles 33a as there are in the armature disc assembly. Coils 34a are connected in series as shown diagrammatically in Figure 3, for purposes of absolute clarity.

The windings 34a are of such a direction as to give the adjacent poles opposite polarity at any given instant and one terminal 35a of the field series winding is connected to binding post A, which is, in turn, connected to brush carrier 37, the other terminal 36a of the field winding is connected to binding post B which is, in turn, connected to brush carrier 37a.

It will be seen, in Figure 1, that there are two field assemblies and it is to be understood that they are similar in their details, and connected in series, as clearly shown in the diagram Figure 4.

It will be further seen that there is an assembly of electromagnetic coils on each side of the armature disc 14, and it is to be understood that they, too, are similar, but the poles on the opposite sides of the disc are in staggered relationship as shown in Figures 1 and 4. The two sides of the armature are in series, and the entire field and the entire armature windings are in parallel connection as shown clearly in Figure 4.

In the diagram illustrated in Figure 5, the rotor windings have been shown in series with the field which under certain conditions, may be a preferable arrangement.

In the example illustrated, there are twenty-four poles on each field plate, and twenty-four poles on each side of the armature disc. The poles of the fields on the right plate aline with those on the left plate. The number of poles can be varied and their electrical connections can be wired in any combination of shunt and series that may be desired.

In the diagram, Figure 4, the number of poles in each group has been reduced to four, so that the principle involved can be readily seen and understood. All magnetic cores are the same in size and spacing, and all coil windings are of the same size conductor and of the same number of turns so that all electro-magnets have the same characteristics.

The armature poles are spaced from the field poles by a small air gap 38 and since all poles are on the same radius from the axis of rotation, the rotor poles are in close proximity to the field poles at all times. Spacer bars 39 hold the field plates in correct spaced relationship with the rotor.

The brush carriers 37 and 37a are mounted on a dielectric ring 40 which is held in place by binding posts A and B. Elongated slots 41 and 42 permit the ring 40 to be rotated through a few degrees by means of knob 43 attached thereto, and which projects out through a slot 44 in the field plate 12R. Similar brush holders 45 and 45a are mounted on a ring, not shown, in a similar manner on field plate 12L to serve the left side of the armature, shown in Figure 2.

In Figure 4 the right and left side of the rotor are designated by the reference characters 14R and 14L, respectively, and all parts are shown as they are at a given instant, always looking in the direction of arrow 4 in Figure 1.

Consider that a current of electrical energy is flowing in the directions indicated by the arrows on the conductors. Current enters the motor through binding post A, where it is conducted through the brush carriers and brushes to the commutator, thence to the conductive rings, thence around the armature windings and across common conductor 22 to the left side of the rotor, around these windings 34 and out through brush 30 to post D and return conductor 23.

Likewise, current will flow from post A around the field windings 34a, across common conductor 22, around the field windings on the left side of the motor and out through post D.

Pole N1 is being attracted by pole S1 and repulsed by pole N2 to urge it in the direction indicated by the arrows, or counter-clockwise.

On the right side of the motor, all field poles are repulsing all rotor poles because similar poles are alined with each other. This condition of attraction and repulsion exists entirely around the rotor, causing it to rotate. As the rotor poles on the left side aline with the field poles on the left field plate 12L, the commutator segments 50 and 51 contact brushes 29 and 30 to reverse the direction of current flow throughout the entire armature winding on the left side, making the polarity of the rotor similar to the fixed polarity of the field poles that are in alinement, causing repulsion on the entire left side of the rotor.

At the same time this occurs, the rotor poles on the right side are midway between the field poles on the right field plate 12R and are being attracted and repulsed in the forward rotating direction. This reversal of polarity occurs alternately on the left and right sides of the rotor every time the rotor poles aline with the field poles, and there is no dead center.

This is the principle of attraction and repulsion of electromagnets in a very practical and simple device that will produce a high starting torque and continue to transform electrical energy into mechanical energy in a very efficient manner for the following reasons:

All electro-magnets, both field and rotor, are constructed, as nearly identical as possible. This fact insures similar factors of impedance in the windings and similar factors of hysteresis and reluctance in the cores. This situation produces a balanced condition at all times and insures perfect coordination of phase. Since the brushes are capable of being rotated about the commutator, they can be adjusted to a slight lead ahead of the position of the rotating poles, to allow for the electro-magnetic inertia as the rotor polarity is reversed. Thus the motor can be timed for maximum efficiency, and since the windings are all placed well out from the axis of the motor, they are very free to radiate any heat that may be generated.

Another important advantage in this design, is the relatively large number for short electromagnets.

Since the magnetomotive force of a solenoid coil is equal to the number of ampere-turns multiplied by the constant 1.2566 and the magnetic flux in an electro-magnet is equal to the magnetomotive force of its coil divided by the reluctance of its core, it will readily be seen that the smaller the reluctance, the greater the magnetic flux.

The components of reluctance, aside from the specific material, are length of core divided by cross sectional area. Therefore, other factors being equal, the shorter the electro-magnet, the less will be the reluctance and the greater will be the flux, proving that many short electromagnets produce more flux than fewer long magnets, even though the total number of ampere-turns is the same.

What I claim and desire to secure by Letters Patent is:

1. In an electric motor, an annular stator electromagnet, having a plurality of axially projecting pole pieces, adjacent poles being of opposite sign, a rotor, a similar annular rotor electromagnet having pole pieces projecting axially toward the stator poles, a polarity-reversing commutator on the rotor, conductive brushes contacting the commutator, and means for simultaneously rotating the brushes about the commutator to change the time of polarity reversal.

2. In an electric motor, two annular stator electromagnets having pole pieces projecting axially, adjacent poles on each electromagnet being of opposite sign and the poles of one electromagnet projecting toward and aligning with the poles on the other, a rotor between the stator electromagnets, an annular rotor electromagnet on the rotor similar to the stator electromagnets and having pole pieces projecting toward those of one of the stator electromagnets, a second similar rotor electromagnet on the rotor having pole pieces projecting opposite to the first said rotor pole pieces and out of axial alignment therewith, and means for reversing the polarity of the rotor poles in timed relation to their position with reference to the stator poles.

HOWELL T. PERSHING, Jr.